US012809851B2

(12) United States Patent
Heymann et al.

(10) Patent No.: US 12,809,851 B2
(45) Date of Patent: Nov. 24, 2026

(54) COMPUTING UNIQUE OBJECT IDS FOR CROSS-APPLICATION ANALYTICS

(71) Applicant: SAP SE, Walldorf (DE)

(72) Inventors: Juergen Heymann, Heidelberg (DE); Michael Wuschek, Rauenberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 19/194,802

(22) Filed: Apr. 30, 2025

(65) Prior Publication Data

US 2026/0236454 A1 Aug. 13, 2026

Related U.S. Application Data

(60) Provisional application No. 63/756,653, filed on Feb. 10, 2025.

(51) Int. Cl.
*G06F 16/23* (2019.01)
*G06F 16/25* (2019.01)

(52) U.S. Cl.
CPC ........ *G06F 16/2365* (2019.01); *G06F 16/252* (2019.01)

(58) Field of Classification Search
CPC .................................................. G06F 16/2365
USPC .......................................................... 707/690
See application file for complete search history.

(56) References Cited

U.S. PATENT DOCUMENTS

| | | | | |
|---|---|---|---|---|
| 2006/0195460 | A1* | 8/2006 | Nori | G06F 16/252 |
| 2022/0101834 | A1* | 3/2022 | Chen | G10L 15/1822 |
| 2024/0378305 | A1* | 11/2024 | Acharya | G06F 21/6227 |

* cited by examiner

*Primary Examiner* — Syling Yen

(74) *Attorney, Agent, or Firm* — Buckley, Maschoff & Talwalkar LLC

(57) ABSTRACT

A system and method including specifying, for a defined integration flow, a first entity type of at least one data object associated with at least one producer system and a second entity type of at least one data object associated with at least one consumer system are logically equivalent; receiving, from the at least one producer system and the at least one consumer system, metadata including key fields of the at least one data object of the first entity type from the at least one producer system and a source identifier of the at least one data object of the second entity type from the at least one consumer system that references the at least one producer system; and determining, based on the metadata, a same value for an object identifier for each of the at least one first entity type and the second entity type, respectively.

20 Claims, 12 Drawing Sheets

100

200

300

500

505 510 515 520 525

```
"fillProducerOID": [   // unconditional OID compute
   {
       "targetColumnName": "CostCenterOID",
       "delimiter": "~",                         // optional; default is "~"
       "sourceColumnNames": [
            "CompanyCode",
            "CostCenterID"
       ]
       "isEnabled": true       // debug feature
   }
]
```

*FIG. 5*

600

605 610 615 620

```
"fillPotentialConsumerOID": [
  {
    // there can be multiple plugin definitions for the same target field
    "targetColumnName": "CostCenterOID",
    "sourceOIDColumnName": "inputOID",

    // syntax version: with string expressions (check for 'only safe syntax')
    "sourceKeyElements": [
      "legalEntity",      // segment 1: companyCode
      "externalId[4:7]"   // segment 2: costcenter ID
      // if we needed to add a constant suffix "-A001": "externalId[4:7]+'A001'"
    ],
  }
```

*FIG. 6*

COMPUTING UNIQUE OBJECT IDS FOR CROSS-APPLICATION ANALYTICS

CROSS REFERENCE TO RELATED APPLICATIONS

The present application claims the benefit of U.S. Patent Application No. 63/756,653 entitled "COMPUTING UNIQUE OBJECT IDS FOR CROSS-APPLICATION ANALYTICS" and filed Feb. 10, 2025. The entire content of that application is incorporated herein by reference.

BACKGROUND

In most instances, software applications are written to run in a standalone manner, wherein the applications generate and/or have access to all of the data and other artifacts needed to execute, including their own local identifiers or IDs (e.g., a customer number, an order number, a purchase order number, etc.) for the data used thereby. In most cases, a customer/user will have multiple applications that are to be integrated in some form. Specifically, a user of multiple different applications might want to use the same data across two or more different applications or systems (e.g., an accounting system that tracks financial data for the user's manufacturing business and a commerce system that manages e-commerce sales for the user's business) for various reasons. For example, the customer might want to copy some financial data from the accounting application to the commerce system where the financial data will be further processed. As such, there would be an integration data flow where data is copied from the accounting system to the e-commerce system.

In most cases, for various technical reasons, the original data from one application will not be represented exactly the same (or "as-is") in another application or system. For example, naming conventions, syntax, data encodings, storage schema, etc. for the exchanged data will usually differ between the different applications and systems. This also applies to the object IDs that are used in different systems so that even objects copied in an integration data flow can have different object IDs in different systems. In these cases, one or more key mappings (e.g., a mapping table, etc.) that specify the corresponding local IDs between the first system and the second system for the particular data item/entity/object exchanged between the systems may be used to accurately reference the related data item/entity/object exchanged between the systems.

Determining and maintaining accurate key mappings between different systems in integration data flows can be a complex undertaking. For instance, the sender/producer application or system of data in an integration data flow might not typically know the mapping(s). Accordingly, in most cases only the receiver/consumer system of the data exchange knows how the keys are mapped, i.e. the consumer usually knows the local ID(s) of the producer. This means that often the key mappings are implemented within one of the applications as part of the integration and therefore there is no easily accessible central place to access the existing key mappings. Knowledge about the existing key mappings is important when developing further integrations but even more so when attempting to combine data from multiple applications in cross-application analytics scenarios. In the latter use scenario, it is crucial to know which technical data objects in different systems actually represent the same business object, e.g., a Product, a CostCenter, an Order, etc. In another aspect, the different applications and systems usually utilize local IDs that are, at most, unique to each application or system. When data from these systems is to be combined in any way in integration or analytics, the result includes ID conflicts.

Accordingly, it would therefore be desirable to provide a framework or infrastructure to provide a unique global identifier for data exchanged between different applications and systems in an integration data flow, but without the need to alter the integration data flow itself, where the global identifier can be used to accurately and efficiently process data across multiple different applications for a variety of integration data flows and analytics use cases.

BRIEF DESCRIPTION OF THE DRAWINGS

FIG. 5 is an illustrative depiction of an OID computation plugin for a producer application, in accordance with an example embodiment herein;

FIG. 6 is an illustrative depiction of a plugin for a consumer application, in accordance with an example embodiment herein;

DETAILED DESCRIPTION

The following description is provided to enable any person in the art to make and use the described embodiments. Various modifications, however, will be readily apparent to those in the art.

Embodiments may provide a framework and process for computing object identifiers (OIDs) for data in a data platform for an existing integration data flow. As used herein, an integration data flow refers to and generally includes all data integrations between multiple applications and systems where data is copied between applications and systems (sometimes simply referred to as a system or an application herein) where there is some knowledge, embodied somewhere, regarding how the source and destination object IDs correspond to each other. As used herein, a data platform may refer to and encompass a data repository and processing system (e.g., Software as a Service, SaaS) that handles data ingestion, storage, data analytics, and other data management processes, including the unification of different data types from various applications and systems to generate insights thereof. A data platform herein may be provided by a combination of hardware and software applications, systems, and services, including but not limited to, data storage facilities, servers, databases, data processing engines (e.g., for transforming data, cleaning data, etc.), and other data architecture(s) that may be implemented as centralized or distributed infrastructures such as cloud computing and data repositories. As used herein, an "existing" integration data flow refers to an integration data flow that has been at least defined to specify the exchange of one or more data items, entities, or objects (sometimes referred to simply as a data object or data entity herein) between two or more applications and systems. In some aspects, the present disclosure relates to the computation of a OID in a data platform (e.g., an analytics infrastructure) as part of the data ingestion thereof wherein the OID has the same computed value for a source/producer application or system data object and a destination/consumer application or system data object in an existing integration data flow.

In some aspects herein, features of some embodiments may include one or more of (i) an OID field (e.g., an atomic String) added in the data platform records to all data objects exchanged in an integration data flow; (ii) generating the same OID value on both sides of an integration data flow where the computation is controlled by or based on metadata provided by the applications of the integration data flow; and (iii) all cross-application navigation/joins (e.g., data unifications) can be accomplished using the computed OID for a variety of cross-application analytics use cases.

Figure 1:
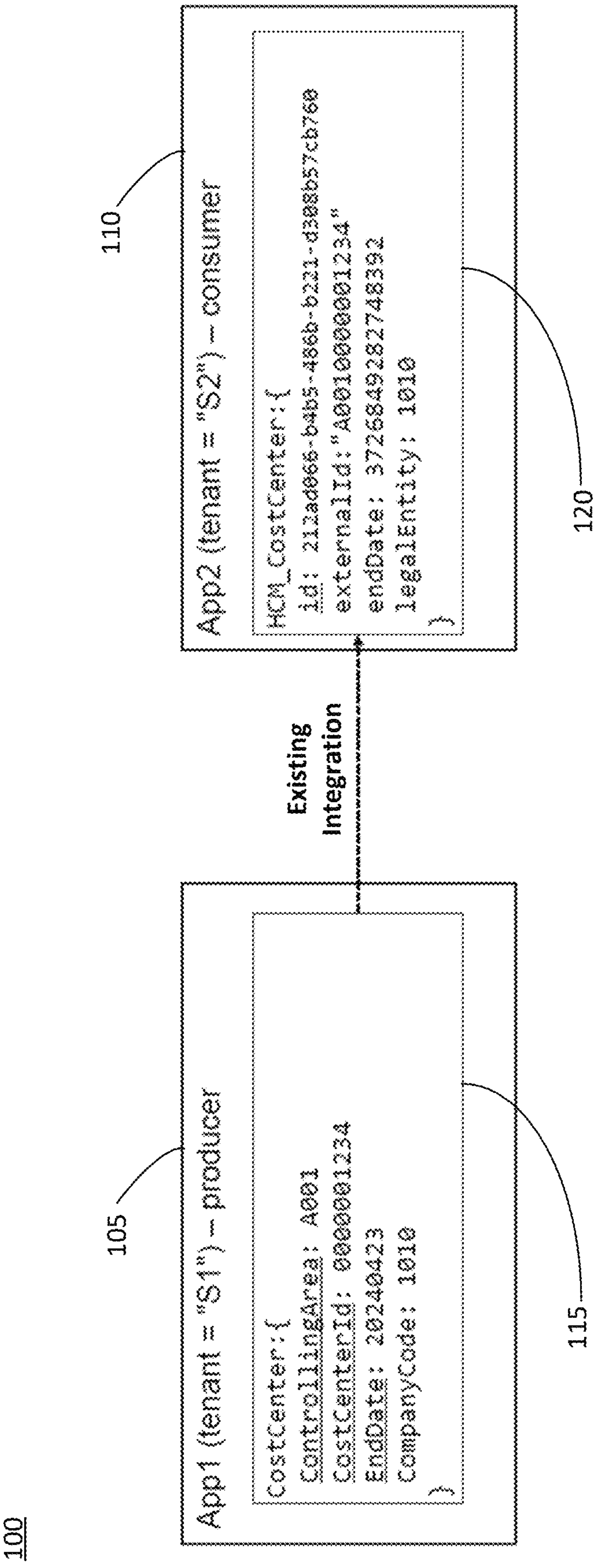
FIG. 1 is an illustrative schematic diagram of an integration data flow, in accordance with an example embodiment herein.

FIG. 1 includes an illustrative schematic diagram of an integration data flow 100, in accordance with an example embodiment herein. In FIG. 1, the integration data flow 100 is an existing integration data flow that can define an exchange of one or more data items, entities, or objects (e.g., data objects) between a first system 105 (i.e., App1) and a second system 110 (i.e., App2), where each system is an application tenant. In the example of FIG. 1, only one data object is shown as being exchanged between the first system 105 and the second system 110, In the example of FIG. 1, system 105 provides App1 having a tenantID="S1" and system 110 provides App2 having a tenantID="S2". In the integration data flow 100 depicted in FIG. 1, App1 is a producer or source application that generates or otherwise sources a data object 115 that is copied or replicated to a consumer or destination App2 as data object 120 in accordance with the defined integration data flow between systems 105 and 110. In this example, the producer application (App1) data object 115 is named "CostCenter" and has a composite key including the fields "ControllingArea", "CostCenterID", and "EndDate" for a particular company identified by "CompanyCode"=1010. Here, data object 115 copied to system 110 is represented by data object 120 within the consumer application (App2) and is named "HCM_CostCenter" having one key field "id" that happens to be a UUID. The key values of the producer object are stored in the consumer object in several fields, namely a first field "externalId", where the consumer application combines (e.g., concatenates) the "ControllingArea" key value and the "CostCenterID" value and a second "endDate" field in the data object 120 that logically refers to the "EndDate" in data object 115 but is encoded differently (i.e., in seconds). Also, the "legalEntity" field in the consumer application's data object 120 corresponds to the "CompanyCode" of the producer application's data object 115 having the same value (i.e., "1010"), although having a different name.

Thus, to effectively "reverse" the consumer mapping scheme to realize which particular data objects (e.g., data object 120 and data object 115) correlate to each other, it is important to know (a) which key fields and values from data object 115 map to which fields and values of data object 120, (b) consider different field names and (c) possibly different value encodings as they were realized in the integration data flow 100. As depicted in FIG. 1, combining or joining the data represented by data objects 115 and 120 may be a complicated endeavor, requiring knowledge of and tracking of multiple different data artifacts and data transformations, where this task can be required for each object and integration flow that a customer wants to analyze and join.

Figure 2A:
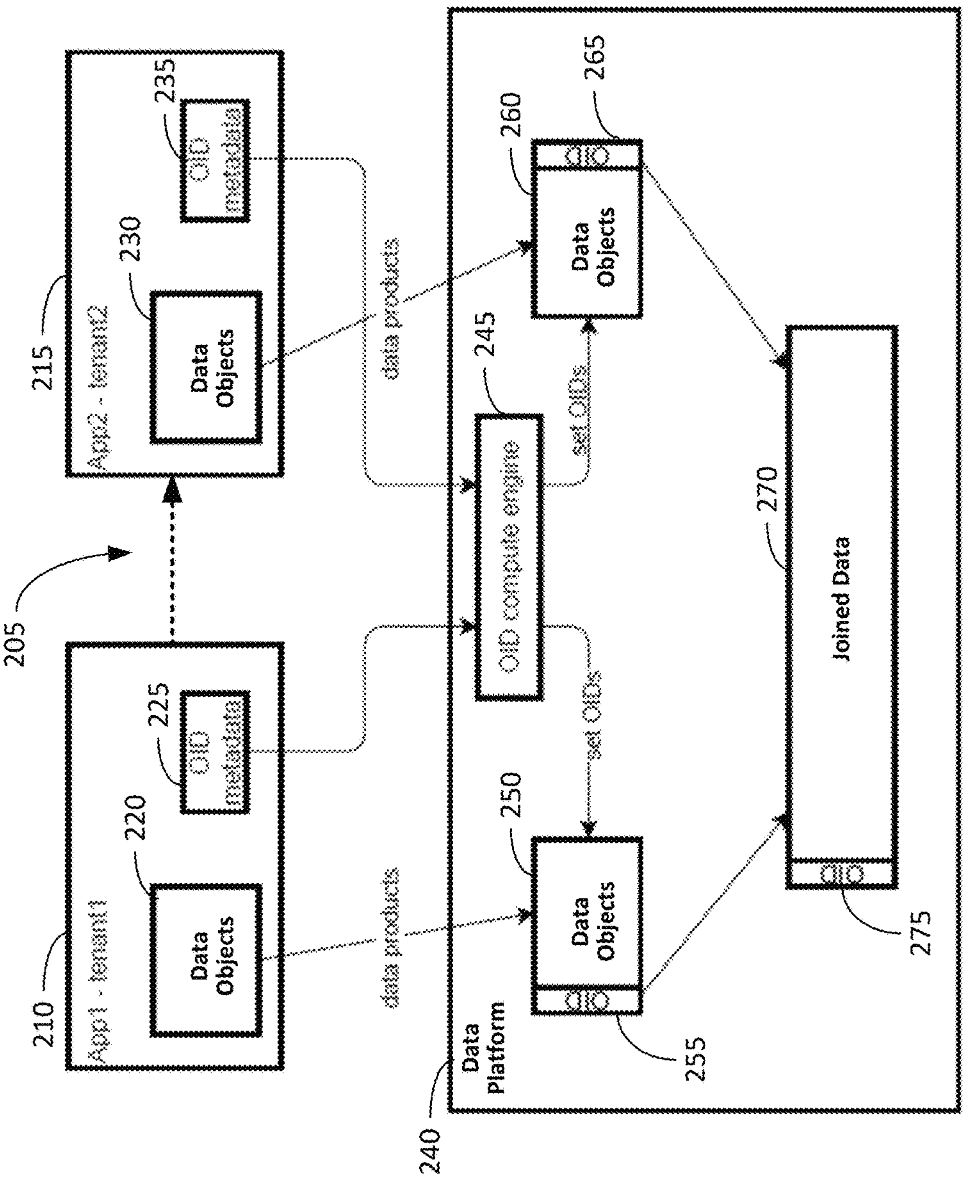
FIG. 2A is an illustrative system architecture to facilitate a computation of object identifiers (OIDs) for an integration data flow, in accordance with an example embodiment herein.

FIG. 2A is an illustrative system architecture 200 to facilitate a computation of object identifiers (OIDs) for an integration data flow 205, in accordance with an example embodiment herein. In FIG. 2A, the integration data flow 205 defines an exchange of data objects 220 by producer system 210 that are copied to consumer system 215 as data objects 230. System 200 further includes a data platform 240 that may be configured to store and manage data products from producer system 210 and consumer system 215. In the example of FIG. 2A, data platform 200 receives and stores data from system 210 as data 250 and also receives and stores data from system 215 as data 260. In some embodiments, data platform 240 might be configured to, via the execution of one or more systems, applications, services, scripts, etc. (not explicitly shown in FIG. 2A) combine data 250 and data 260 as unified or joined data 270. In some instances, the joined data may be processed to provide insights regarding the data from the systems 210 and 215.

In accordance with the present disclosure, the data platform includes an OID compute engine 245 that is configured to generate OIDs for the data flow(s) related to the existing integration data flow 205 by an OID compute engine 245. In some embodiments, the OIDs generated by the OID compute engine 245 may be generated using metadata 225 provided by the producer system 210 and metadata 235 provided by the consumer system 215. In some embodiments, the OIDs generated by the OID compute engine 245 may be generated strictly based on metadata 225 and metadata 235. In some aspects, the generation of the OIDs generated by the OID compute engine 245 may be computed independently of the integration data flow 205 in the sense that the computation of the OIDs by the OID compute engine 245 might not interrupt or otherwise alter a configuration or execution of the existing integration data flow 205.

In some embodiments, OIDs generated by OID compute engine 245 relate to specific, corresponding and logically equivalent data objects 220 and 230, where such OIDs have the same computed value. In some aspects, the computed OIDs for data objects 220 from system 210 that are stored in the data platform 240 as data objects 250 include a set of OIDs generated by the OID compute engine 245 based on metadata 225 that is stored with the data objects 250 as OIDs 255. Similarly, the data objects 230 from system 215 that are stored in the data platform 240 as data objects 260 include a set of OIDs generated by the OID compute engine 245 that is stored with the data objects 260 as OIDs 265. In this manner, OID compute engine 245 can generate one OID for the same logical data objects (e.g., two data objects) in the systems/applications 210 and 215, where data objects 250 and 260 can be efficiently and accurately combined to obtain joined data 270. In some aspects, corresponding OIDs 255 and 265 have the same value(s). In some aspects, joined data 270 combines, unifies, or otherwise consolidates data objects 250 and its associated OIDs 255 with data objects 260 and its associated OIDs 265.

In some aspects, communication between system 210, system 215, and data platform 240 may be facilitated and functionally enabled by one or more application programming interfaces (APIs) or the like mechanisms. In some embodiments, data platform 240 may use APIs (or other mechanisms) to communicate messages, instructions, and data to and from systems 210, 215, and other systems and applications (not shown in FIG. 2A) using one or more communication protocols, without limit unless otherwise stated herein. In some aspects, systems 210 and 215 offload their data to data platform 240, where OID compute engine 245 computes or otherwise determines the global, unique OIDs for all applications in the data platform. In some instances, data platform 240 may interface with other applications, services, and systems (not shown in FIG. 2A) that may use joined data 270 and further process the joined data and its associated OIDs 275, including some applications, services, and systems external to data platform 240.

In some embodiments, "data source tenant configuration" information might be needed in some cases in the data platform. The "data source tenant configuration" information is not shown in FIG. 2A, as it might be needed only when the metadata provided by the applications does not include the 'source tenant ID' information for an integration flow.

Figure 2B:
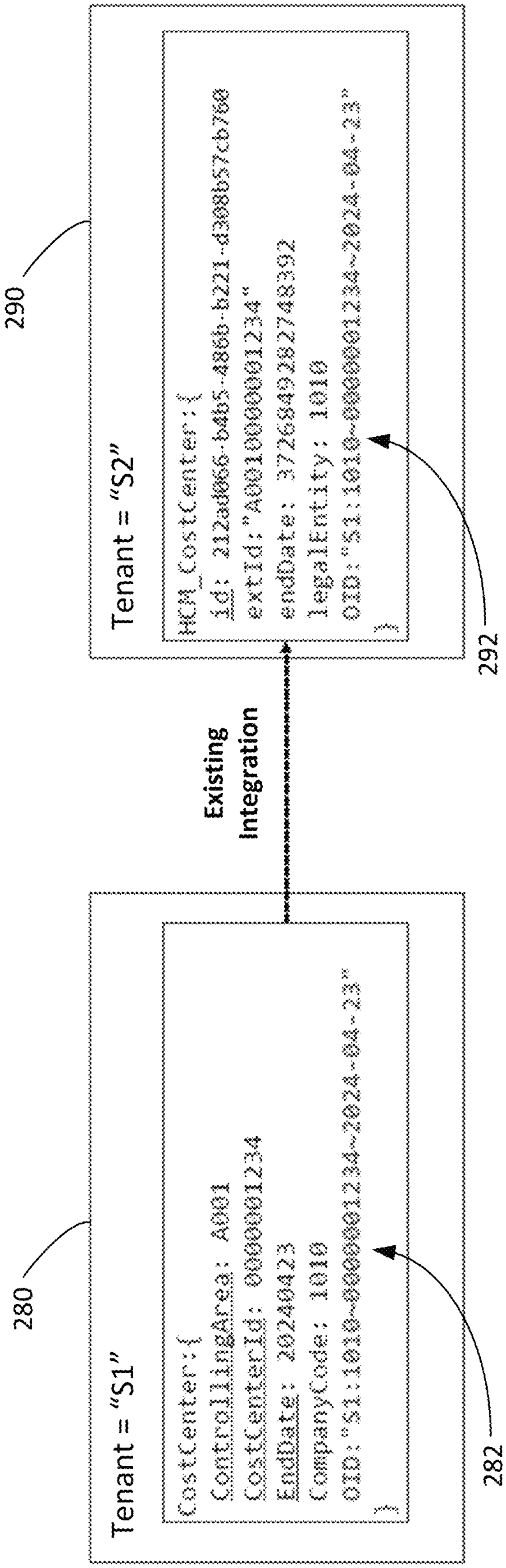
FIG. 2B is an illustrative schematic diagram of an integration data flow, including computed OIDs associated therewith, in accordance with an example embodiment herein.

FIG. 2B is an illustrative schematic diagram of an integration data flow, including computed OIDs associated therewith, in accordance with an example embodiment herein. In FIG. 2B, the integration data flow defines an exchange of data objects by producer system 280 that are copied to consumer system 290. In some aspects, the data objects of the producer application and the consumer application are received by the data platform (e.g., FIG. 2A, data platform 240), wherein the data platform computes OIDs 282 and 292. As seen, the OID values 282 and 292 are the same. That is, the data platform computes the same global, unique OIDs for the producer system 280 and the consumer system 290.

Figure 3:
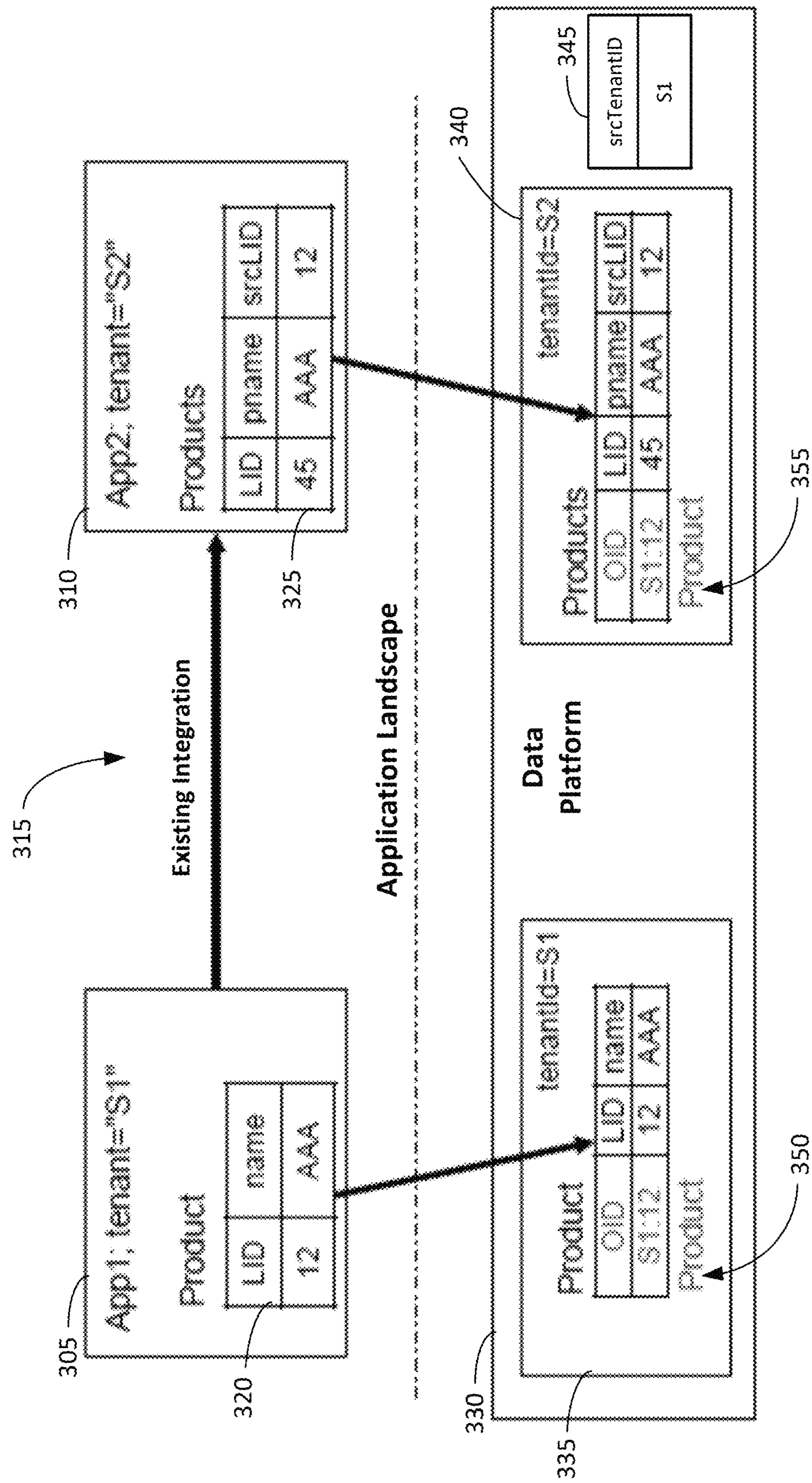
FIG. 3 is an illustrative depiction of data records in an integration data flow and corresponding data records including an OID in a data platform, in accordance with an example embodiment herein.

FIG. 3 is an illustrative depiction 300 of data records in an integration data flow and corresponding data records including an OID in a data platform, in accordance with an example embodiment herein. As used herein, an application can have many instances, where each instance can be a tenant, even in one customer landscape. The term "system" herein is generally a synonym for an application instance/tenant, not a technical server. In the example of FIG. 3, system 305 or first application instance (App1; tenant=S1) is a "producer" of data objects exchanged in an integration data flow 315 and a system 310 is a second application instance (App2; tenant=S2) that is a "consumer" of data objects exchanged in the integration data flow as shown. System 305 (i.e., application instance App1) includes a data object 320 named "Product" that includes a local Id (LID=12) and one field "name" that holds the product name, in this example "AAA" as the name of a AAA battery. As part of the existing integration data flow 315, data object 320 is copied to system 310 (i.e., application instance App2). In App2, the copied data object is represented as data object 325 named "Products" (i.e., a different name than that used in application instance App1) and three fields including a local ID ("LID"=45) having a value that is different than LID in App1, a "name"=AAA that is the same as App1, and a source local ID ("srcLID"=12) that is a new field with a new value that the consumer system (i.e., application instance App2) knows represents the source of the local ID in the producer system (i.e., application instance App1).

In some aspects, consumer application instance (App2) has to remember the local ID of the producer application ("LID"=12), otherwise the consumer application instance (App2) cannot accurately process updates or other changes to the original data object 320 provided by the producer application instance (App1) and the existing integration data flow 315. Here, the consumer application instance knows that the local ID of the producer application instance=12. As such, the consumer application instance knows that the next time it obtains a data object from the producer application with the producer LID "12", it must look into srcLID to identify the matching consumer record to update the data object 325. As illustrated, the integration data flows is already defined or exists.

In some aspects as depicted, each of the systems 305 and 310 including application instances App1 and App2, respectively, store data objects 320 and 325 as shown in the existing integration of FIG. 3, where there is no universal, common, unique OID or other representation thereof in data objects 320 and 325.

Still referring to FIG. 3, there are two roles, including a producer (App1) and a consumer (App2) as defined by the configuration of the integration data flow 315. Both of these applications may write all of their data to a data platform 330 (e.g., a cloud-based analytics infrastructure system provided as a SaaS, etc.). As illustrated, the OID field does not exist in the data in the application landscape, it does not exist in the applications and it does not exist in the integration data flow 315. Instead, as shown in the example embodiment of FIG. 3, the OID is created, initially as an empty field, in the data platform (e.g., an analytics layer) and later filled in the data platform.

In the example of FIG. 3, based on the defined configuration of the integration data flow 315, it may be known that App1 (i.e. system 305) is the producer, with tenant ID=S1 and local ID (LID)=12. In some embodiments, the configuration information and details of the integration data flow might be expressed as metadata associated with the systems 305 and 310. In some aspects, based on the configuration information (e.g., metadata), the OIDs herein may be generated or otherwise determined by, for example, concatenating at least some of the configuration information (i.e., metadata) together. In the example of FIG. 3 (and other examples herein unless stated otherwise) an OID may be represented as concatenated with a colon in the middle, where, for example, the colon is the separator between context ID=tenantID of the producer and the LIDs. For example, the OID calculated or determined for the logically equivalent data object 320 (i.e., "Product") and data object 325 (i.e., "Products") is shown as having a same (or common) name="Product" and a value represented as "S1:12". In some aspects, other conventions and configurations may be used for representing a global, unique OID, without departing from the scope of the present disclosure.

In some embodiments, as a general rule, a context ID (e.g., tenant=S1) and the local ID (LID=12) may be used to generate the OID. In an instance when there are multiple local ID fields, e.g., a composite key with two key field values of "DE" and "12", then there may be a sequence of ID values e.g., OID="S1:DE~12", in this case with a "~" (tilde) as key separator. In some aspects, other conventions and configurations may be used for representing a global, unique OID, without departing from the scope of the present disclosure.

Accordingly, the OID for the producer application in the example of FIG. 3 may be determined by the data platform as outlined above. As disclosed, the determination of the OID for the producer application is computed by metadata provided by the system 305 (i.e., the producer application).

Regarding a determination of the OID for the data object 325 received by the data platform 330 from the consumer application (App2), computation of the OID having a same value as the OID computed for the producer application (App1) may be relatively more complex. As illustrated in the example of FIG. 3, the consumer application (App2) stores the local ID of the producer application (App1) in a 'source local ID field' (i.e., "srcLID") of data object 325. The LID, name, and source local ID fields of the data object 325 are copied from the consumer application (App2) to the data platform 330 (e.g., an analytics platform). Herein, the data platform wants to compute the same OID for the replicated data object 325 of the producer application (App2) that is/was created for the data object 320 of the producer application (App1). For this purpose, in addition to the producer local ID, the data platform 330 needs to know where the replicated data object 325 of the consumer application came from (i.e., its source tenant). For example, what is the tenant ID associated with the data source of the data object 325 of the consumer application. Herein, a tenant ID may refer to a number or identifier of an application instance/tenant.

In some embodiments, an identity of the data source may be derived automatically from the configuration of the integration data flow. In some embodiments, a customer or other user might select the data source. In the example of FIG. 3, a determination of the data source may be relatively straightforward since there is only one possible source. In some instances where there are multiple (e.g., 2 or more) potential sources, the data source for a copied data object may be determined or selected as the "master" of the subject data object. This is shown as the information "srcTenantID" in FIG. 3.

In the present example, the tenant ID of the producer system 305 for data object 325 is tenant ID=S1 as indicated at 345. Having determined or otherwise identified the data source tenant ID=S1 and knowing the local ID of the producer application (i.e., srcLID) as indicated in the replicated data objected 340 received from the consumer application (App2), the OID for the consumer application (App2) can be computed for the replicated data object 325 of the consumer application (App2) by the data platform 330 from these two fields. In some embodiments, these fields may be identified in metadata of the consumer application (App2).

In this manner, the data platform computes the OID for the data object 340 received from the consumer application (App2) using the two fields, including (srcLID=12) and (srcTenantID=S1) that references the data source of replicated data object 325 to generate the OID associated with data object 340 in the data platform and the data platform computes the OID for the data object 335 received from the producer application (App1) using the producer application's fields (LID=12) and their own tenant information (tenant=S1) to generate the OID associated with data object 335 in the data platform. The data platform 330 computes the same OID (e.g. "OID=S1:12") values for both the producer application's data replicated in the data platform (i.e., data object 335) and the consumer application's data replicated in the data platform (i.e., data object 340).

In some embodiments, the OID generated by the data platform are associated with each data object, for example data objects 335 and 340. In some aspects, the generated OID associated with each data object replicated in the data platform may be stored in a record including the respective data objects. For example, in some embodiments the generated OIDs may be expressed in either a separate mapping table (or other data structure) in the data platform or they may be stored directly in the respective data objects, without an intermediate mapping table (or other data structure). In some instances, the intermediate mapping table (or other data structure) might be used for certain special cases and can be generated as needed (e.g., controlled by configuration) from the same metadata that computes the OIDs. As such, different format(s) might be used to store the OIDs.

Figure 4:
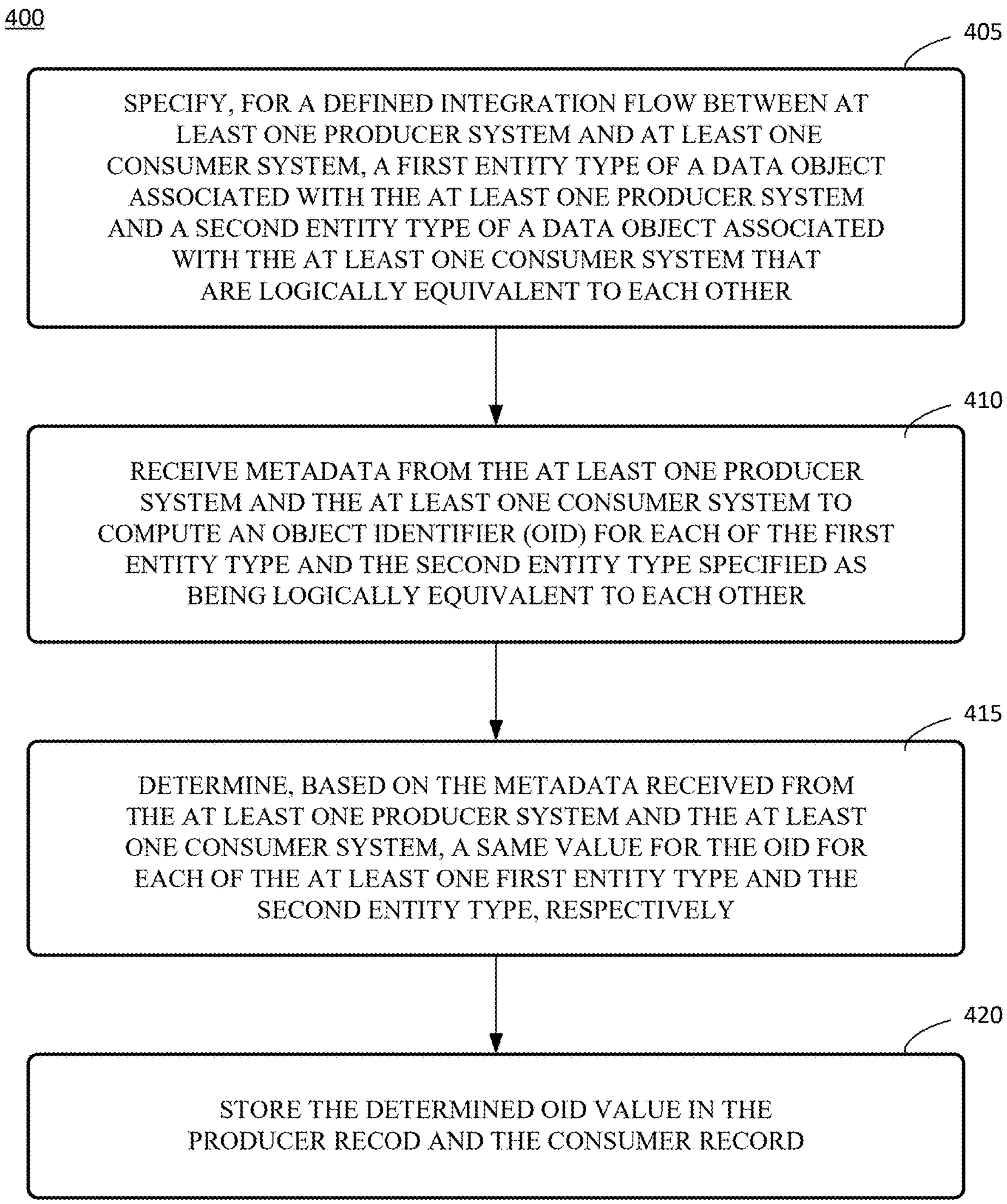
FIG. 4 is an illustrative process flow related to a computation of OIDs, according to an example embodiment.

FIG. 4 is an illustrative process 400 related to a computation of OIDs, according to an example embodiment. Process 400 may be executed by a system, architecture, or framework including at least some of the features and components of a system disclosed herein, such as, for example, the system architecture generally depicted in FIG. 2A. In some aspects, the process of FIG. 4 will be discussed with references to FIG. 3, with FIG. 3 providing an example of some of the features and aspects disclosed in process 400. At operation 405, a first entity type (FIG. 3, "Product") of at least one data object (FIGS. 3, 320) associated with at least one producer system (FIG. 3, App1) and a second entity type ("Products", FIG. 3) of at least one data object (FIGS. 3, 325) associated with at least one consumer system (App2) are specified as being logically equivalent to each other. In some aspects, the at least one producer system (FIG. 3, App1) and the at least one consumer system (App2) are associated, related, or involved with each other via an existing or defined integration data flow (FIG. 3, existing integration 315). In some aspects, static information between two types in two applications have a "1-to-1" correspondence. This correspondence might be expressed by the consumer entity metadata referring to the producer entity type/metadata.

Operation 410 includes receiving, from the at least one producer system (FIG. 3, App1) and the at least one consumer system (FIG. 3, App2), information expressed as metadata to compute an OID for each of the first entity type (FIG. 3, "Product") and the second entity type (FIG. 3, "Products") specified as being logically equivalent to each other. In some embodiments, the metadata includes the specification of key fields of the at least one data object (FIGS. 3, 320) of the first entity type (FIG. 3, "Product") from the at least one producer system (FIGS. 3, 305) and a source identifier (FIG. 3, "srcLID=12") of the at least one data object (FIGS. 3, 325) of the second entity type (FIG. 3, "Products") from the at least one consumer system (FIGS. 3, 310) that references the at least one producer system (FIGS. 3, 305) that sources the at least one data object (FIGS. 3, 325) of the second entity type (FIG. 3, "Products"). That is, the metadata that will be used to compute the OIDs is received by the data platform at operation 410.

Operation 415 includes determining, based on the metadata received from the at least one producer system (FIGS. 3, 305) and the at least one consumer system (FIGS. 3, 310), a same value for the OID for each of the first entity type (FIG. 3, "Product") and the second entity type (FIG. 3, "Products"), respectively. In some embodiments, determining the same value for the OID for each of the first entity type and the second entity type is automatically executed in response to the data platform receiving instances of the at least one data object (FIGS. 3, 335) of the first entity type and instances of the at least one data object (FIGS. 3, 340) of the second entity type, respectively. In some aspects, the data platform may compute OIDs for the data objects stored therein in an undefined order (e.g., as the data objects are received). In this manner, some embodiments herein might comprise an "OID-compute" process.

In some embodiments, instead of computing the OIDs locally in the producer or consumer systems, the consumer system might compute the srcLID of the producer system, obtain the srcTenantID from somewhere (e.g., configuration information, metadata, etc.) and then copy the OID value from the producer record to the consumer record. That is, some embodiments herein might comprise an "OID-copy" process.

Continuing to operation 420, the determined OID value(s) may be stored in a respective record with each of the first entity type (FIG. 3, "Product") and the second entity type (FIG. 3, "Products") in a data platform (FIGS. 3, 330) that computes (or otherwise determines) the OIDs for each of the data objects (FIGS. 3, 335 and 340) replicated in the data platform. In some embodiments, the determined OID (i.e., mapping) might also be stored in a central data repository or other separate storage device, data structure, or data management system and not only with the respective records.

In some embodiments, the specification that the first entity type and the second entity type are logically equivalent to each might be accomplished, at least in part, by at least one of assigning a same cross-application type name to both the first object entity type. This feature is illustrated in FIG. 3 wherein the replicated data objects 335 and 340 are both assigned or designated the same naming label "Product" as indicated at 350 and 355. In some embodiments, a customer or other user of the data platform of the present example might be authorized to define a type mapping between the first entity type and the second entity type (e.g., submit a selection via a user interface (UI) or other mechanism). In some embodiments, the consumer metadata may explicitly reference the corresponding producer application and 'source entity type'.

In some embodiments herein, at least one of the first entity type (FIG. 3, "Product") and the second entity type (FIG. 3, "Products") is associated with a designated grouping of a plurality of data objects. For example, multiple instances of a "Product", even from different producer applications might be grouped together and collectively referenced when determining OIDs for the producer applications.

In some embodiments, process 400 may further include combining the record of the first entity type (FIG. 3, "Product") including the determined OID value (e.g., FIG. 3, replicated data object 335) and the record of the second entity type (FIG. 3, "Products") including the same determined OID value (e.g., FIG. 3, replicated data object 355) as illustrated in FIG. 2A by joined data 270. For example, the OID can be included in the joined data 270 as shown by OID 275 in FIG. 2A, where the possible join is first defined by the OIDs 255 and 265 of the first level data products (e.g., data objects 250 and 260) and the common OID is carried over into the joined data 270. In some other embodiments, the joined data 270 and OID 275 might be determined immediately by the data platform based on metadata from the producer application (FIGS. 2A, 210) and consumer application (FIGS. 2A, 215), wherein the determination of data objects 250 and 260 are skipped.

In some aspects, the processing performed by a data platform herein might be accomplished by the execution of one or more applications, servers, systems, database management systems, services, etc. For example, an OID compute engine herein (e.g., FIGS. 2A, 245) might be implement using OID "plugins", where the parameters for an OID computation might be specified by the OID plugin. In some embodiments, an OID plugin herein defines how the OID is computed in the data platform for a specific role. That is, the OID plugin contains the OID computation parameters as specified by the data object owners. In some aspects, each OID field in an entity can have 0 . . . 1 provider plugins and 0 . . . n consumer plugin definitions, where only one plugin might be active per OID field that is written. Examples of plugins compatible with the present disclosure will be presented below.

FIG. 5 is an illustrative depiction of a plugin 500 for a producer application, in accordance with an example embodiment herein. In some aspects, plugin 500 might be used to specify parameters for generating an OID for the producer application (App1) depicted in FIG. 1. As illustrated, plugin 500 includes a number of different fields, including a plugin name field of "fillProducerOID" 505. Plugin 500 specifies the target column the OID value is to write to when computed in the data platform at "targetColumnName" 510. The "delimiter" field 515 specifies, in the instance of multiple segments, how the multiple segments are connected (e.g., "~"). Plugin 500 also specifies the location of the source if the OID is retrieved from the backend by "sourceOIDColumn" field 520. Plugin 500 further specifies two fields 525 ("CompanyCode" and "CostCenterID") that indicate a composite key where these two fields will be connected together with the producer application's tenant ID to compute the OID for the producer application. The "isEnabled" field may be a Boolean that might define the initial activation state of OID computation.

FIG. 6 is an illustrative depiction of a plugin 600 for a consumer application, in accordance with an example embodiment herein. In some aspects, plugin 600 might be used to specify parameters for generating an OID for the consumer application (App2) depicted in FIG. 1. For this example, plugin 600 might be defined to generate a "Cost Center OID", on the consumer side, as indicated by its name "fillPotentialConsumerOID" 605. This example plugin specifies a target column to write the "CostCenterOID" to as specified by "targetColumnName" 610 and a source column for the OID as specified by "sourceOIDColumnName" 615. Additionally, this example plugin defines for the consumer application OID that "legalEntity" 620 is the first key segment and the second key segment is a portion of the "externalID[4:7]" 625 (i.e., parsed string segment from the "externalID"). In this manner, a developer (or other personnel, system, etc.) might define plugins once, wherein the plugin may be executed automatically by a data platform when the producer OIDs or the consumer OIDs are to be generated.

FIG. 7-10 schematically illustrate various aspects of different use cases that the present disclosure provides a practical application for, in agreement with some embodiments herein. The different use cases depicted in FIG. 7-10 are examples of some possible applications and scenarios for which the present disclosure might be specifically applied to generate OIDs in a data platform for data replicated therein. FIG. 7-10 are not intended to be an exhaustive presentation of all possible use cases and applications compatible with the present disclosure, but rather exemplary instances thereof. Further, a lack of specific details regarding the computation of OIDs for any of the examples in FIG. 7-10 is not to be construed as a lack of applicability of the present disclosure to any of the examples, since it should be understood that one or more of the features and aspects of the present disclosure might be applied, alone or in combinations thereof, to any of the disclosed example use cases.

In some aspects, FIG. 7-10 illustrate different possible integration data flows that might exist in application landscapes and what they might need in terms of OID computation in a data platform in some embodiments herein.

In some aspects, OIDs are related to connecting entities and abstracting from key mappings. As such, particular communication technologies that might be used (e.g. message protocols like SOAP, events/stream processing frameworks, APIs, etc.) are not specifically discussed. For the example use cases, aspects of significance might include, for example, whether key mapping done for a specific integration, in an instance key mapping is done, is the key mapping performed on the sender or receiver side and how is the key mapping accomplished/stored; and is there a customer configuration for the integration or can the customer change how the key mappings are done and stored.

In general, the examples of FIG. 7-10 each relate to an integration data flow between two systems (app tenants) S1 to S2 where "S1", "S2" can be instances of the same or different applications. In the examples of FIG. 7-10, "S1" and "S2" are also used as the tenant IDs.

Figure 7:
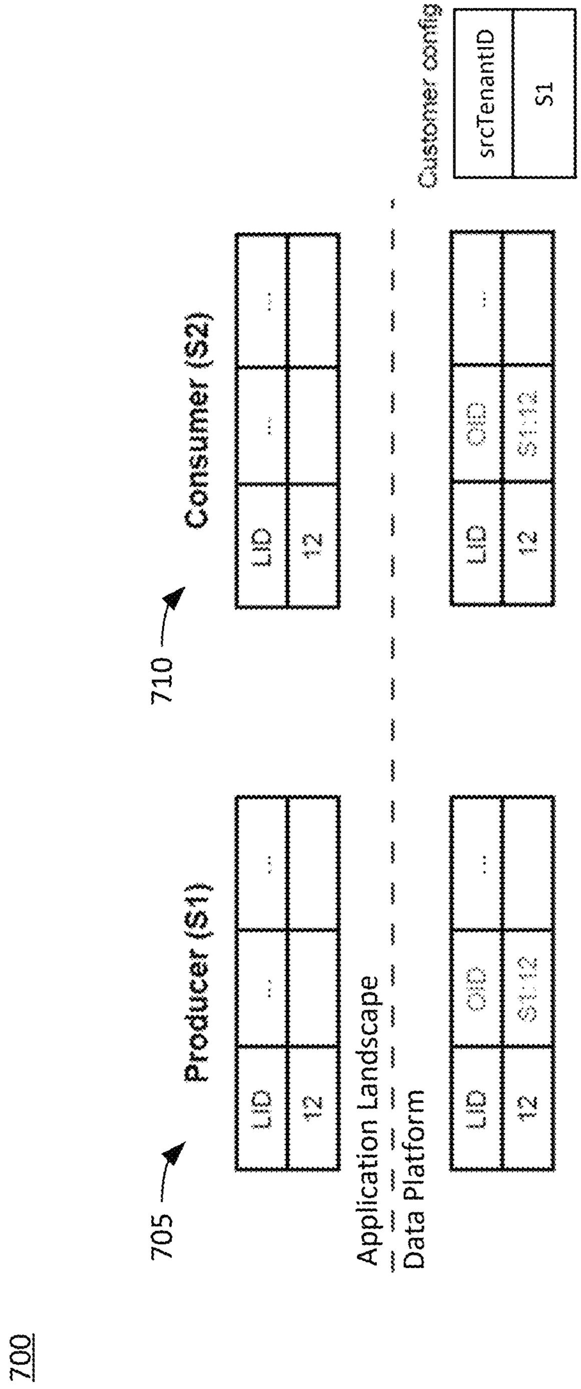
FIG. 7 is an illustrative depiction of data records in an integration data flow and corresponding data records including an OID in a data platform for a use case including no key mapping, in accordance with an example embodiment herein.

FIG. 7 is an illustrative depiction of a use case 700 of a simple case where a consumer (S2) 710 can take over the producer (S1) 705 local ID (LID=12) as-is and no key mapping is needed. The knowledge that the consumer LID is compatible with the producer LID is known by the consumer at design time and therefore a developer of the consumer plugin can simply specify their own consumer LID field name as the only element in the "sourceKeyElements" parameter of the consumer plugin.

Figure 8:
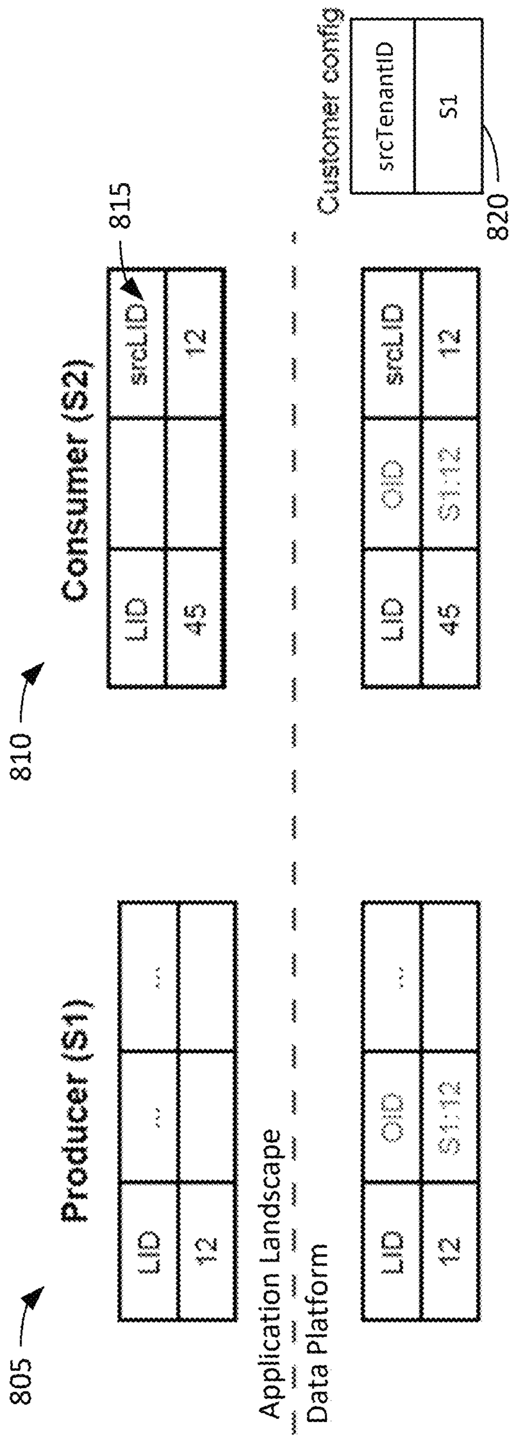
FIG. 8 is an illustrative depiction of data records in an integration data flow and corresponding data records including an OID in a data platform for a use case including a simple key mapping in a consumer, in accordance with an example embodiment herein.

FIG. 8. is an example use case wherein the srcLID of the producer 805 is stored in a separate field "srcLID" 815 in the consumer 810. A consumer plugin developer being knowledgeable of this information can simply specify the field name "srcLID" as the only entry in a "sourceKeyElements" field. Together with the provided or configured 'srcTenantID' 820, the consumer plugin can compute the same OID (S1:12) as the producer plugin.

Figure 9:
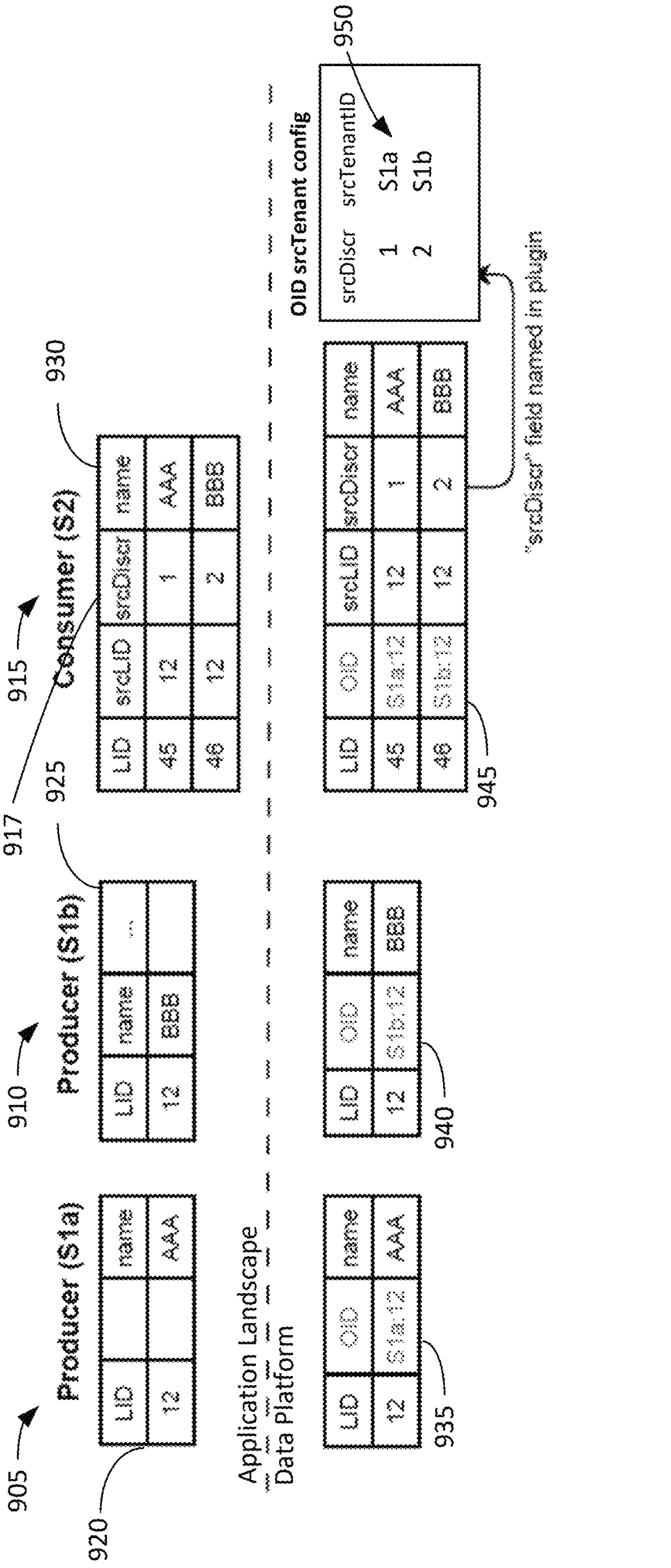
FIG. 9 is an illustrative depiction of data records in an integration data flow and corresponding data records including an OID in a data platform for a use case including multiple producers, in accordance with an example embodiment herein.

FIG. 9 is an illustrative depiction of a use case where one consumer (S2) 915 gets data from two (i.e., multiple) different producers (S1a and S1b) 905 and 910 for the same object type. Data records 920, 925 are copied to consumer records 930 in an integration data flow and the corresponding data records 935, 940, and 945 including an OID in a data platform, in accordance with an example embodiment herein. When a data object is exchanged, a stable producer local ID is also passed and stored in the consumer as srcLID so that updates can be processed by the consumer application (e.g., typically for master data) or for the consumer application to be able to call back to producer application with the local IDs. In this example where the consumer application can receive data from multiple sources, the consumer application generally has a way to discriminate where the data came from. For this particular example, the consumer application needs to distinguish between the two producer applications and does so by using a source discriminator that distinguishes the objects with the same "LID=12" from different sources (e.g. "srcDiscr=1" for producer application 905 and "srcDiscr=2" for producer application 910). The consumer application has a source discriminator and the data is stored separated per data source (with local IDs, local codes etc. of producer application) in the consumer and the source is identified by the data source discriminator, like a tenant ID as indicated at 917. The discriminator separates data on an object instance level.

For OID computation purposes, the OID for the producers is determined based on local information, where a consumer plugin might designate the source discriminator (e.g., "srcDiscr") field as plugin parameter. For each data source, the corresponding srcTenantID 950 must be known and can be provided either as metadata from the consumer application or by customer configuration. For the consumer OID computation, the consumer data plane DP exposes the key mapping "srcLID" as usual and computation of the OID uses srcTenantID [srcDiscr value] and srcLID to compute the OID for the consumer.

Figure 10:
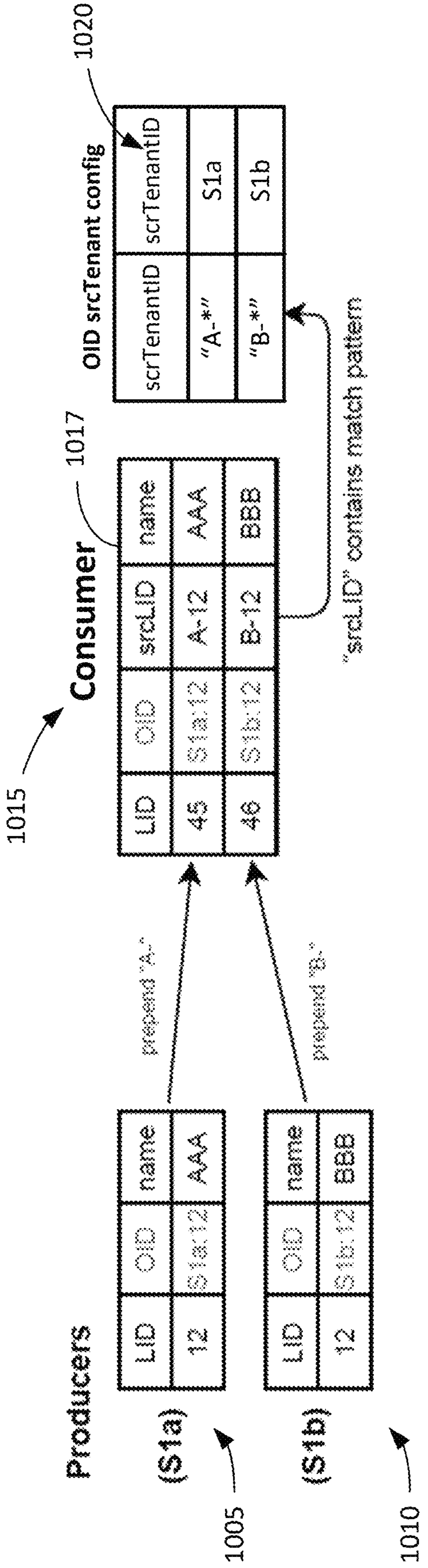
FIG. 10 is an illustrative depiction of data records in an integration data flow for a use case including multiple producers with data source encoded IDs, in accordance with an example embodiment herein.

In some use cases, an application itself cannot handle multiple data sources and does not keep data separated by provider (i.e., producer application). However, there still may be multiple data sources feeding into one consumer application when the integration data flow ensures that the data object IDs of the incoming data objects are disjoint. This can be accomplished, for example, by middleware that prepends some kind of prefix to the data object IDs depending on the data source. Such a scenario is shown in FIG. 10 that includes two producer applications 1005 and 1010 (tenants S1a and S1b, respectively) that pass their LIDs in an integration and some middleware prepends a different prefix per provider ("A-" and "B-" for producers S1a and S1b, respectively) so that the consumer 1015 sees disjoint LIDs. These prefixes are included in the data copied to the consumer application represented by record 1017 and can be used to distinguish the data source. Thus, the srcLID stored in the consumer encodes the data source in its value. In some aspects, a key to handling this situation and determining the data source tenant is to use the "srcDiscr" field as regex pattern against the "srcLID".

Here, the OID for the producer application is computed using local information, where a plugin for it may further designate a source discriminator (srcDiscr) field as a parameter, but a customer specifies not just a fixed value but match patterns (e.g., simple regex) and the plugin includes parameters of a sourceDiscriminator field (e.g.: "srcLID" (<name of field>)) s represented at 1020 and a sourceDiscriminatorUseRegex field (=true).

For the computation of the consumer OID, the OID configuration might require that a customer configure one data source (srcTenantID) per srcDiscr pattern and a customer may specify each row—srcDiscr match pattern, and then select the associated srcTenantID. For the OID compute for the consumer application, the consumer data platform exposes the key mapping srcLID (as usual) and uses a regex match to select srcDiscr and then uses the corresponding configured srcTenantID (e.g., shown at 1020 in FIG. 10) to compute the OID.

Figure 11:
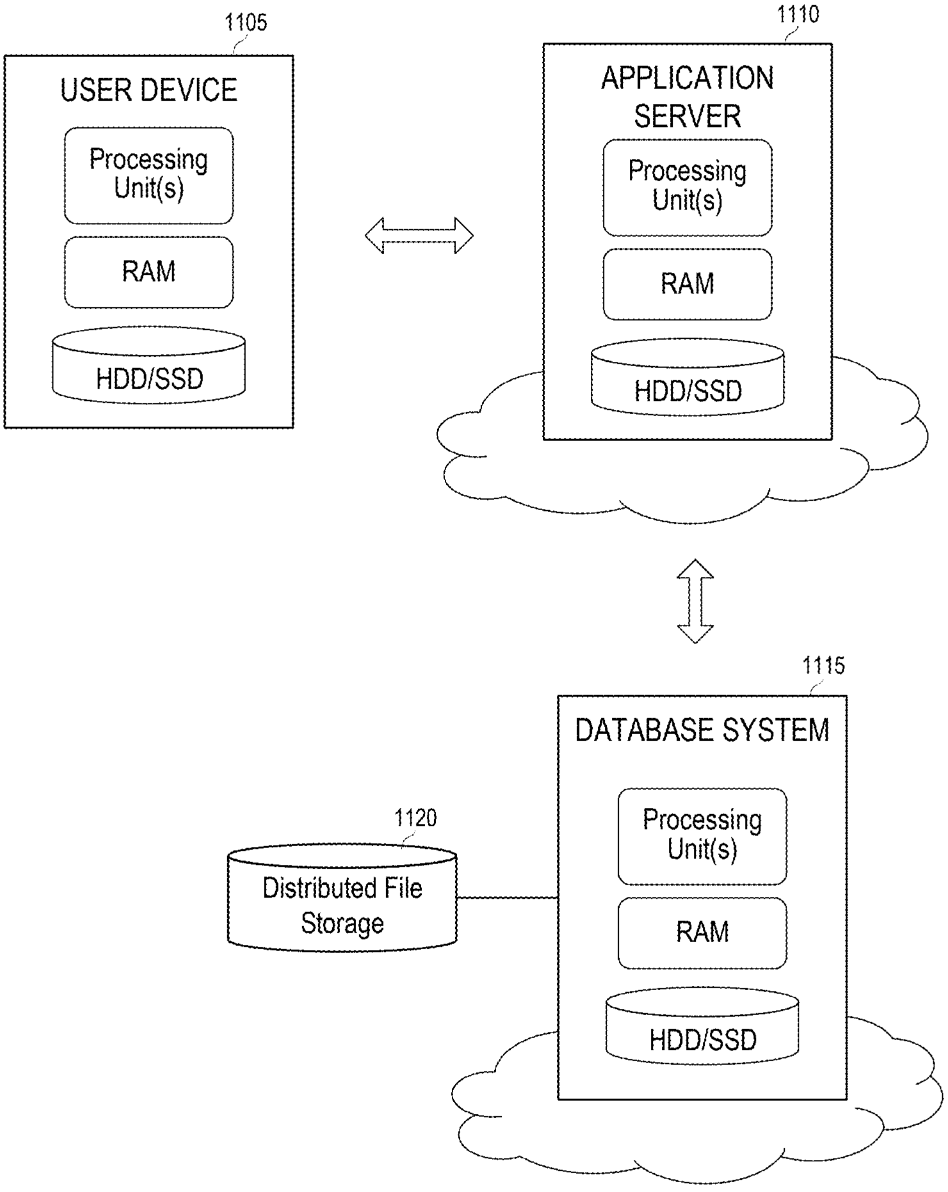
FIG. 11 is an illustrative block diagram of a cloud-based system, in accordance with an example embodiment herein.

FIG. 11 illustrates a cloud-based database deployment according to some embodiments. The illustrated components may reside in one or more public clouds providing self-service and immediate provisioning, autoscaling, security, compliance and identity management features. User device 1105 may interact with applications executing on application server 1110, for example via a Web Browser executing on user device 1105, in order to create, read, update and delete data managed by database system 1115 and persisted in distributed file storage 1120. Database system 1115 may store data and may execute processes as described herein, including operations to compute OIDs in a data platform for existing integration data flows. Application server 1110 and/or database system 1115 may comprise cloud-based compute resources, such as virtual machines, allocated by a public cloud provider that provides a service (e.g., SaaS) having some features and attributes that are configured to compute OIDs and other features of a data platform disclosed herein. As such, application server 1110 and database system 1115 may exhibit demand-based elasticity.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

Embodiments disclosed herein are solely for the purpose of illustration. Those in the art will recognize other embodiments may be practiced with modifications and alterations to that described above.

What is claimed is:

1. A computer-implemented method, the method comprising:

specifying, for an integration flow defining an exchange of information between at least one producer system and at least one consumer system, at least one data object of a first entity type associated with and sourced by the at least one producer system that is replicated as at least one data object of a second entity type associated with the at least one consumer system;

storing, by a data platform configured to store and manage data objects from the at least one producer system and the at least one consumer system, the at least one data object of the first entity type from the at least one producer system and the at least one data object of the second entity type from the at least one consumer system;

receiving, metadata associated with data objects associated with the at least one producer system from the at least one producer system and metadata associated with data objects associated with the at least one consumer system from the at least one consumer system, the metadata including key fields of the at least one data object of the first entity type from the at least one producer system and a source identifier of the at least one data object of the second entity type from the at least one consumer system that references the at least one producer system that sources the at least one data object of the second entity type;

determining, based on the metadata received from the at least one producer system and the at least one consumer system, respectively, an object identifier (OID) for each of the data objects associated with the at least one producer system and an OID for each of the data objects associated with the at least one consumer system, data objects associated with the at least one producer system and the at least one consumer system being logically equivalent to each other having a same value for the determined OID for each of the data objects associated with the at least one producer system; and storing, in the data platform, the determined OID value in a respective record with each of the at least one data object of the first entity type from the at least one producer system and the at least one data object of the second entity type from the at least one consumer system.

2. The method of claim 1, wherein the specifying that the data objects of the first entity type and the second entity type are logically equivalent to each other includes at least one of assigning a same cross-application type name to both the first object entity type and the second entity type and defining a type mapping between the first entity type and the second entity type.

3. The method of claim 1, wherein the determining of the same value for the determined OID for each of the data objects associated with the at least one producer system and the at least one consumer system is automatically executed in response to receiving instances of the at least one data object associated with the at least one producer system and instances of the at least one data object associated with the at least one consumer system, respectively.

4. The method of claim 1, wherein the determining of the value for the OID for each of the data objects associated with the at least one producer system of the first entity type is based on metadata exclusively from the at least one producer system.

5. The method of claim 1, further comprising combining the record of the at least one data object of the first entity type including the determined OID value and the record of the at least one data object of the second entity type including the same determined OID value stored.

6. The method of claim 1, wherein the receiving of the metadata, the determining of the value for the OID, and the storing of the determined OID value in the respective records with each of the at least one data object of the first entity type and the at least one data object of the second entity type is executed in a data platform, independently of an execution of the defined integration flow.

7. The method of claim 6, wherein the determined OID value is a unique global value for the data platform.

8. The method of claim 1, wherein the determined OID value is further stored in one or more of a central data repository, storage device, data structure, and data management system distinct from the respective record with each of the at least one data object of the first entity type and the at least one data object of the second entity type.

9. A system comprising:

at least one programmable processor; and a non-transitory machine-readable medium storing instructions that, when executed by the at least one programmable processor, cause the at least one programmable processor to perform operations comprising:

specifying, for an integration flow defining an exchange of information between at least one producer system and at least one consumer system, at least one data object of a first entity type associated with and sourced by the at least one producer system that is replicated as at least one data object of a second entity type associated with the at least one consumer system;

storing, by a data platform configured to store and manage data objects from the at least one producer system and the at least one consumer system, the at least one data object of the first entity type from the at least one producer system and the at least one data object of the second entity type from the at least one consumer system;

receiving, metadata associated with data objects associated with the at least one producer system from the at least one producer system and metadata associated with data objects associated with the at least one consumer system from the at least one consumer system, the metadata including key fields of the at least one data object of the first entity type from the at least one producer system and a source identifier of the at least one data object of the second entity type from the at least one consumer system that references the at least one producer system that sources the at least one data object of the second entity type;

determining, based on the metadata received from the at least one producer system and the at least one consumer system, respectively, an object identifier (OID) for each of the data objects associated with the at least one producer system and an OID for each of the data objects associated with the at least one consumer system, data objects associated with the at least one producer system and the at least one consumer system being logically equivalent to each other having a same value for the determined OID for each of the data objects associated with the at least one producer system; and storing, in the data platform, the determined OID value in a respective record with each of the at least one data object of the first entity type from the at least one producer system and the at least one data object of the second entity type from the at least one consumer system.

10. The system of claim 9, wherein the specifying that the data objects of the first entity type and the second entity type are logically equivalent to each other includes at least one of assigning a same cross-application type name to both the first object entity type and the second entity type and defining a type mapping between the first entity type and the second entity type.

11. The system of claim 9, wherein the determining of the same value for the determined OID for each of the data objects associated with the at least one producer system and the at least one consumer system is automatically executed in response to receiving instances of the at least one data object associated with the at least one producer system and instances of the at least one data object associated with the at least one consumer system, respectively.

12. The system of claim 9, further comprising combining the record of the at least one data object of the first entity type including the determined OID value and the record of the at least one data object of the second entity type including the same determined OID value stored.

13. The system of claim 9, wherein the receiving of the metadata, the determining of the value for the OID, and the storing of the determined OID value in the respective records with each of the at least one data object of the first entity type and the at least one data object of the the second entity type is executed in a data platform, independently of an execution of the defined integration flow.

14. The system of claim 9, wherein the determined OID value is further stored in one or more of a central data repository, storage device, data structure, and data management system distinct from the respective record with each of the at least one data object of the first entity type and the at least one data object of the second entity type.

15. A non-transitory, computer readable medium storing instructions, which when executed by at least one processor cause a computer to perform a method comprising:

specifying, for an integration flow defining an exchange of information between at least one producer system and at least one consumer system, of at least one data object of a first entity type associated with and sourced by the at least one producer system that is replicated as at least one data object of a second entity type associated with the at least one consumer system;

storing, by a data platform configured to store and manage data objects from the at least one producer system and the at least one consumer system, the at least one data object of the first entity type from the at least one producer system and the at least one data object of the second entity type from the at least one consumer system;

receiving, metadata associated with data objects associated with the at least one producer system from the at least one producer system and metadata associated with data objects associated with the at least one consumer system, the metadata including key fields of the at least one data object of the first entity type from the at least one producer system and a source identifier of the at least one data object of the second entity type from the at least one consumer system that references the at least one producer system that sources the at least one data object of the second entity type;

determining, based on the metadata received from the at least one producer system and the at least one consumer system, respectively, an object identifier (OID) for each of the data objects associated with the at least one producer system and an OID for each of the data objects associated with the at least one consumer system, data objects associated with the at least one producer system and the at least one consumer system being logically equivalent to each other having a same value for the determined OID for each of the data objects associated with the at least one producer system; and storing, in the data platform, the determined OID value in a respective record with each of the at least one data object of the first entity type from the at least one producer system and the at least one data object of the second entity type from the at least one consumer system.

16. The medium of claim 15, wherein the specifying that the data objects of the first entity type and the second entity type are logically equivalent to each other includes at least one of assigning a same cross-application type name to both the first object entity type and the second entity type and defining a type mapping between the first entity type and the second entity type.

17. The medium of claim 15, wherein the determining of the same value for the determined OID for each of the data objects associated with the at least one producer system and the at least one consumer system is automatically executed in response to receiving instances of the at least one data object associated with the at least one producer system and instances of the at least one data object associated with the at least one consumer system, respectively.

18. The medium of claim 15, further comprising combining the record of the at least one data object of the first entity type including the determined OID value and the record of the at least one data object of the second entity type including the same determined OID value stored.

19. The medium of claim 15, wherein the receiving of the metadata, the determining of the value for the OID, and the storing of the determined OID value in the respective records with each of the at least one data object of the first entity type and the at least one data object of the second entity type is executed in a data platform, independently of an execution of the defined integration flow.

20. The medium of claim 15, wherein the determined OID value is further stored in one or more of a central data repository, storage device, data structure, and data management system distinct from the respective record with each of the at least one data object of the first entity type and the at least one data object of the second entity type.

* * * * *